(12) United States Patent
Dehm et al.

(10) Patent No.: US 9,593,208 B2
(45) Date of Patent: Mar. 14, 2017

(54) POLYSILOXANES WITH QUATERNIZED HETEROCYCLIC GROUPS

(71) Applicant: RUDOLF GMBH, Geretsried (DE)

(72) Inventors: Volker Dehm, Wolfratshausen (DE); Gunther Duschek, Benediktbeuern (DE); Rainer Hayessen, Geretsried (DE); Dirk Sielemann, Wolfratshausen (DE); Martin Teichert, Wolfratshausen (DE)

(73) Assignee: RUDOLF GMBH, Geretsried (DE)

( * ) Notice: Subject to any disclaimer, the term of this patent is extended or adjusted under 35 U.S.C. 154(b) by 0 days.

(21) Appl. No.: 15/023,930

(22) PCT Filed: Sep. 19, 2014

(86) PCT No.: PCT/EP2014/070019
§ 371 (c)(1),
(2) Date: Mar. 22, 2016

(87) PCT Pub. No.: WO2015/040171
PCT Pub. Date: Mar. 26, 2015

(65) Prior Publication Data
US 2016/0208052 A1  Jul. 21, 2016

(30) Foreign Application Priority Data
Sep. 23, 2013 (DE) .................. 10 2013 219 046

(51) Int. Cl.
| | |
|---|---|
| C09D 183/08 | (2006.01) |
| C08G 77/388 | (2006.01) |
| C08L 83/08 | (2006.01) |
| D06M 15/643 | (2006.01) |
| C09D 5/16 | (2006.01) |
| C08G 77/26 | (2006.01) |

(52) U.S. Cl.
CPC ............ *C08G 77/388* (2013.01); *C08L 83/08* (2013.01); *C09D 5/1675* (2013.01); *C09D 183/08* (2013.01); *D06M 15/6436* (2013.01); *C08G 77/26* (2013.01); *D06M 2200/12* (2013.01); *D06M 2200/40* (2013.01); *D06M 2200/50* (2013.01)

(58) Field of Classification Search
CPC ..... C08L 83/08; C09D 183/08; C08G 77/388; C08G 77/26; D06M 15/6436; D06M 2200/12; D06M 2200/40; D06M 2200/50
See application file for complete search history.

(56) References Cited

U.S. PATENT DOCUMENTS

| | | |
|---|---|---|
| 3,373,137 A | 3/1968 | Saam |
| 4,891,166 A * | 1/1990 | Schaefer et al. ........ A61K 8/898 554/39 |
| 4,921,895 A | 5/1990 | Schaefer et al. |
| 5,041,590 A | 8/1991 | Snow |
| 5,098,979 A | 3/1992 | O'Lenick |
| 5,115,049 A | 5/1992 | Imperante et al. |
| 5,246,607 A | 9/1993 | Schaefer et al. |
| 5,969,077 A | 10/1999 | Schrock et al. |
| 7,563,857 B2 * | 7/2009 | Lange et al. ........ A61K 8/898 252/8.61 |
| 2002/0068689 A1 * | 6/2002 | Fender et al. .......... C11D 1/62 510/511 |
| 2004/0028827 A1 | 2/2004 | Herzig et al. |
| 2004/0219371 A1 | 11/2004 | Will et al. |
| 2006/0128880 A1 | 6/2006 | Sandner et al. |
| 2006/0223939 A1 | 10/2006 | Lange et al. |
| 2006/0235181 A1 | 10/2006 | Lange et al. |
| 2008/0027202 A1 | 1/2008 | Ferenz et al. |
| 2008/0194785 A1 | 8/2008 | Wagner et al. |
| 2008/0213208 A1 | 9/2008 | Moeller et al. |

FOREIGN PATENT DOCUMENTS

| | | |
|---|---|---|
| DE | 1 570 429 A1 | 10/1969 |
| DE | 102 53 152 A1 | 10/1969 |
| DE | 37 19 086 C1 | 10/1988 |
| DE | 38 02 622 A1 | 8/1989 |
| DE | 196 52 524 A1 | 6/1998 |
| DE | 197 43 722 A1 | 4/1999 |
| DE | 100 04 321 A1 | 8/2001 |
| DE | 100 36 533 A1 | 2/2002 |
| DE | 100 36 678 A1 | 2/2002 |
| DE | 100 36 694 A1 | 2/2002 |
| DE | 100 51 258 A1 | 4/2002 |
| DE | 102 14 982 A1 | 12/2003 |
| DE | 10 2004 006 300 A1 | 9/2005 |
| DE | 10 2005 014 311 A1 | 10/2006 |
| DE | 10 2005 014 312 A1 | 10/2006 |
| DE | 10 2006 035 511 A1 | 2/2008 |
| DE | 10 2008 014 762 A1 | 9/2009 |
| DE | 10 2004 025 131 A1 | 12/2015 |
| EP | 0 368 119 A1 | 5/1990 |
| EP | 0 436 359 A2 | 7/1991 |
| EP | 0 707 029 A1 | 4/1996 |
| EP | 0 781 289 B1 | 11/2002 |
| EP | 1 561 770 A1 | 8/2005 |

(Continued)

OTHER PUBLICATIONS

European Search Report issued with respect to application No. 10 2013 219 046.8, dated Mar. 20, 2014.
International Search Report and Written Opinion issued with respect to application No. PCT/EP2014/070019, dated Oct. 29, 2014.

(Continued)

*Primary Examiner* — Anthony J Green
(74) *Attorney, Agent, or Firm* — Greenblum & Bernstein, P.L.C.

(57) ABSTRACT

The invention relates to polysiloxanes with quaternized heterocyclic groups in the side chain, to the use and production thereof, in particular for finishing textiles and for hydrophobing objects.

35 Claims, No Drawings

(56) References Cited

FOREIGN PATENT DOCUMENTS

| | | |
|---|---|---|
| EP | 1 595 910 A1 | 11/2005 |
| EP | 1595910 A1 * | 11/2005 |
| WO | 96/06834 A1 | 3/1996 |
| WO | 96/08499 A1 | 3/1996 |
| WO | WO 96/06834 A1 * | 3/1996 |
| WO | 02/10255 A1 | 2/2002 |
| WO | 02/10501 A1 | 2/2002 |
| WO | 2004/041912 A1 | 5/2004 |
| WO | 2004/042136 A1 | 5/2004 |

OTHER PUBLICATIONS

International Preliminary Report on Patentability issued with respect to application No. PCT/EP2014/070019, dated Apr. 7, 2016.
Gao et al., "Quaternium-91: A new multifunctional hair conditioning ingredient", Cosmetics&Toiletries, vol. 118, No. 5, May 2003.

* cited by examiner

POLYSILOXANES WITH QUATERNIZED HETEROCYCLIC GROUPS

The present invention relates to polysiloxanes having quaternized heterocyclic groups in the side chain, to the production thereof, and to the use thereof, in particular for finishing textiles and for hydrophobing objects.

Polysiloxanes containing amino groups have long been used as textile finishing agents. Good soft handle effects are achieved in the textiles treated therewith. The advantageous soft handle effects are attributed to the fact that the amino groups in the side chain of the polysiloxane have an affinity to the fibres, and a good soft handle is achieved by the orientation of the polymer molecule resulting therefrom. The polysiloxanes are usually applied to the textile as a fluid preparation, for example in the form of aqueous emulsions.

A disadvantage of the preparations that contain amino-functional polysiloxanes is the lability of the application liquor produced therefrom with regard to pH fluctuations. As a result, at higher pH values, for example at a pH of >7, precipitation of the polysiloxane and/or phase separation is observed in these systems. The lability of the systems is attributed to the different protonation rates of the amino groups. If pH fluctuations occur during the textile finishing process, homogeneous application of the textile finishing agent is no longer guaranteed. However, precisely during the textile finishing process, a number of treatment steps are carried out in a strongly alkaline environment. If washing is not carried out sufficiently, residual quantities of alkalis can remain on the substrate and be carried over into the treatment baths during the subsequent finishing steps. In particular in facilities having little treatment liquor, for example the Foulard machine, the pH of the finishing liquor can increase to >9 in a very short time in this case. Thus, in some circumstances, the heavy precipitations mentioned may occur, meaning that a uniform, stain-free finish of the textile product is no longer possible.

A further disadvantage of the amino-functional polysiloxanes mentioned is their tendency to yellow, which becomes apparent in particular in the case of white and light-coloured textile substrates at drying temperatures of over 120° C., and after long exposure of the finished product to atmospheric oxygen.

It is true that there are various approaches that overcome these disadvantages by appropriately modifying the chemical structure of the polysiloxane used. Thus, by replacing the amino functions with amido functions or permanently quaternized ammonium groups in the polysiloxane used, the tendency of the finished textile product to yellow can be significantly reduced. In addition, good or very good pH stability can be achieved thereby. However, these improvements are accompanied by a significant reduction in the soft handle effect on the finished textile product.

Fatty acid condensates are a further substance class that is widely used as a soft handle agent for textile products. These are produced from a condensation reaction of fatty acids having long alkyl chains and compounds containing one or more amine groups and/or hydroxyl groups, and contain ester functions and/or amido functions and, optionally, quaternary ammonium functions (e.g. in Esterquats) or quaternized imidazolinium heterocycles. In these products, the soft handle results from the interaction of the long fatty residues and anchor groups having textile affinity. Although fatty acid condensates of this kind are not suitable for providing textile products with a soft handle of a quality comparable to that made possible by polysiloxanes, fatty acid condensates are widely used in textile finishing, not least on account of their comparatively low cost. Attempts are therefore being made to improve the soft handle of fatty acid condensates by admixing polysiloxanes with said condensates. However, producing mixtures of fatty acid condensates and organopolysiloxanes is problematic in general on account of the mutual incompatibility thereof. Separation occurs rapidly both in the substance and in preparations, preventing the production of stable, comparatively cheap compound products.

Significant efforts have been made to eliminate the above-mentioned disadvantages.

DE 10 2004 025 131 A1 describes derivatized, permanently quaternized amino-functional organopolysiloxanes comprising nitrogen atoms, which organopolysiloxanes comprise aliphatically quaternized ammonium groups in addition to non-quaternized amino groups.

DE 10 2005 014 311 A1, DE 10 251 526 A1 and DE 10 251 524 A1 disclose polyamino- and/or polyammonium-polysiloxane copolymer compounds, in which quaternized heterocyclic ammonium groups are present in the polymer chain but not in the side chain.

DE 10 051 258 A1 describes quaternary polysiloxanes comprising aliphatic ammonium groups that can contain end-terminated quaternized imidazoline groups.

DE 102 14 982 discloses polysiloxanes for use in textile auxiliary agents. The polysiloxanes contain, as an essential feature, an epoxide group in the side chain, which can react with suitable nucleophilic groups on the textile fibre and thus make covalent bonding possible. The polysiloxanes described in DE 102 14 982 are therefore only suitable for finishing natural fibres such as cotton. Although the covalent bonding of the polysiloxane to the fibre contributes to increased washing durability, it also adversely affects the property behaviour of the finished fibre in terms of the handle behaviour. Moreover, there are toxicological concerns in the event of incomplete reaction of the epoxide groups. The polysiloxanes can inter alia also contain quaternized imidazolinium groups that are bonded to the siloxane backbone by a hydroxy functionalized linker, but the production of which involves significantly high method complexity.

DE 19 652 524 A1 discloses organopolysiloxanes carrying quaternary ammonium groups, in which aliphatic quaternized ammonium groups are present in the side chain.

DE 10 004 321 A1 describes organosilicon compounds that comprise quaternary ammonium groups and tertiary amino groups in the side chain.

WO 96/008499 and WO 96/06834 describe imidazoline-containing silicones and acid salts of imidazoline-containing silicons. EP 707 029 describes imidazoline group-containing organopolysiloxanes.

DE 3 719 086 claims diquaternary end-terminated polysiloxanes.

WO 2004/041912 describes polysiloxanes comprising quaternized heterocyclic aromatics, the positive charge of which is delocalised.

The problem was therefore that of providing an improved polysiloxane that overcomes the disadvantages of the prior art.

It has now been found that polysiloxanes that contain quaternized heterocyclic groups in the side chain have virtually no tendency to yellow and have very good pH stability. In addition, they provide textile substrates with an excellent soft handle. Introducing the alkyl components into the polysiloxane further significantly increases the compatibility with fatty acid condensates, with the result that preparations of the two substance types together are possible.

An aspect of the present invention therefore comprises a polysiloxane comprising at least one structural element of formula (I),

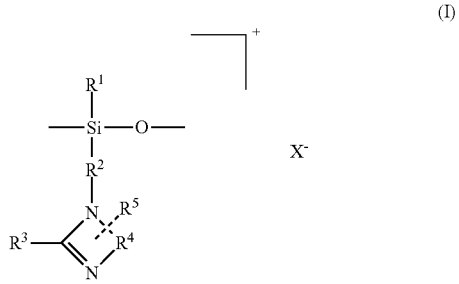

wherein
$R^1$ is $C_{1-6}$ alkyl or phenyl,
$R^2$ is $C_{1-6}$ alkyl,
$R^3$ is a saturated or at least monounsaturated, linear or branched hydrocarbon moiety having 7-29, preferably 11-25, carbon atoms, optionally substituted with hydroxy,
$R^4$ is $-C_aH_{2a}-$, optionally substituted with $C_{1-6}$ alkyl, $C_{1-6}$ alkoxy, hydroxy or amino,
$R^5$ is a saturated, at least monounsaturated or aromatic hydrocarbon moiety having 1-20 carbon atoms, which optionally contains heteroatoms selected from S, O and N, is optionally substituted and, together with one of the two nitrogen atoms in the ring structure, forms a quaternary ammonium ion,
$a$ is 2 or 3, and
$X^-$ is an organic or inorganic anion.

The anions $X^-$ are preferably derived from inorganic or organic acids. Examples of inorganic anions are chloride, bromide, iodide and sulfate. Chloride and sulfate are preferred, chloride being more preferred. Examples of organic anions are methosulfate, tosylate and acetate. Methosulfate and tosylate are preferred.

In a preferred embodiment, the polysiloxane according to the invention comprises at least one structural element of formula (Ia)

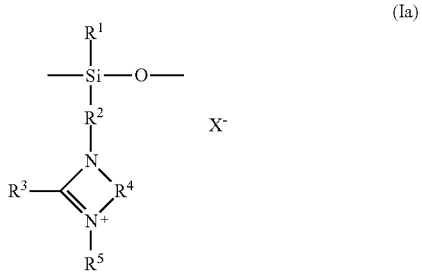

$R^1$ is preferably $C_{1-6}$ alkyl, particularly preferably methyl.
In a preferred variant, $R^2$ is $-(CH_2)_3-$ or $-CH_2-CHCH_3-CH_2-$.

$R^3$ is preferably a saturated or at least monounsaturated hydrocarbon moiety of a fatty acid, the hydrocarbon moiety of a fatty acid referring to the moiety to which the carboxylic acid group ($-COOH$) is bonded.

Preferred saturated fatty acids are lauric acid, myristic acid, palmitic acid, margaric acid, stearic acid, arachic acid, behenic acid, lignoceric acid or cerotic acid, more preferably palmitic acid, behenic acid, lauric acid or stearic acid, particularly preferably stearic acid and behenic acid.

Preferred unsaturated fatty acids are, for example, myristoleic acid, palmitoleic acid, petroselinic acid, oleic acid, elaidic acid, vaccenic acid, gadoleic acid, eicosenoic acid, cetoleic acid, linoleic acid, alpha-linoleic acid, gamma-linoleic acid, calendic acid, punicic acid, alpha-eleostearic acid, beta-eleostearic acid, arachidonic acid, timnodonic acid, clupanodonic acid, cervonic acid, vemolic acid or ricinoleic acid, in particular palmitoleic acid, oleic acid, eicosenoic acid, cetoleic acid, particularly preferably oleic acid and cetoleic acid.

$R^4$ is preferably $-CH_2-CH_2-$ or $-(CH_2)_3-$, more preferably $-CH_2-CH_2-$.

The quaternization by $R^5$ in formula (I) occurs on the nitrogen in position 1 and/or position 3. $R^5$ is preferably $C_{1-6}$ alkyl, particularly preferably methyl or ethyl, or benzyl. $R^5$ can optionally be substituted, preferably with $C_{1-6}$ alkyl, $C_{1-6}$ alkoxy, hydroxy or amino.

The structural element of formula (I) and/or (Ia) preferably makes up 0.1-20 mol. %, more preferably 0.3-10 mol. %, and even more preferably 0.5-5 mol. % based on the polysiloxane. The structural element according to formula (I) and/or (Ia) can be distributed in the polysiloxane statistically, alternately or in the form of blocks. The structural element of formula (I) and/or (Ia) is preferably present statistically distributed in the polysiloxane. Within the scope of the above definition, the structural elements according to formula (I) and/or (Ia) within the polysiloxane molecule can either be the same or different.

The polysiloxane according to the invention further comprises at least one structural element of formula (II),

wherein $R^6$ is $C_{1-10}$ alkyl or phenyl. In a preferred embodiment, $R^6$ is methyl, ethyl or phenyl, more preferably methyl. $R^1$ is as defined above.

The structural element of formula (II) preferably makes up 80-99.9 mol. %, more preferably 90-99.7 mol. %, even more preferably 95-99.5 mol. % based on the polysiloxane. The structural elements of formula (II) can be distributed in the polysiloxane molecule statistically, alternately or in the form of blocks. The structural element of formula (II) is preferably present statistically distributed in the polysiloxane. Within the scope of the above definition, the structural elements according to formula (II) within the polysiloxane molecule can either be the same or different.

In a preferred embodiment, the polysiloxane according to the invention can further comprise at least one structural element of formula (III),

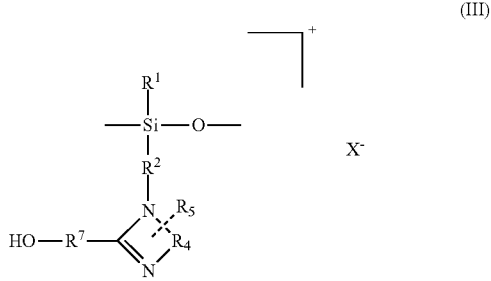

wherein $R^7$ is $C_{2-6}$ alkyl or $C_{3-6}$ alkenyl. $R^7$ is more preferably n-propyl, i-propyl, n-butyl, butyl, n-pentyl, i-pentyl or propenyl, particularly preferably n-propyl. $R^1$, $R^2$, $R^4$ and $R^5$ are as defined above.

In a preferred embodiment, the polysiloxane according to the invention can comprise at least one structural element of formula (IIIa).

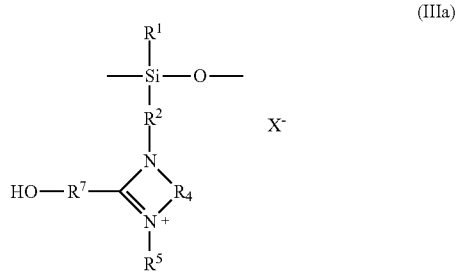

(IIIa)

The structural element of formula (III) and/or (IIIa) preferably makes up 0-4 mol. %, more preferably 0-3 mol. %, more preferably 0-2 mol. % based on the polysiloxane. In another embodiment, the lower limit of structural element (III) and/or (IIIa) is 0.001 mol. %. The structural element according to formula (III) and/or (IIIa) can be distributed in the polysiloxane statistically, alternately or in the form of blocks. The structural element of formula (III) and/or (IIIa) is preferably present statistically distributed in the polysiloxane. Within the scope of the above definition, the structural elements according to formula (III) and/or (IIIa) within the polysiloxane molecule can be the same or different.

In addition, the polysiloxane according to the invention can also comprise at least one structural element of formula (V) and optionally formula (VI),

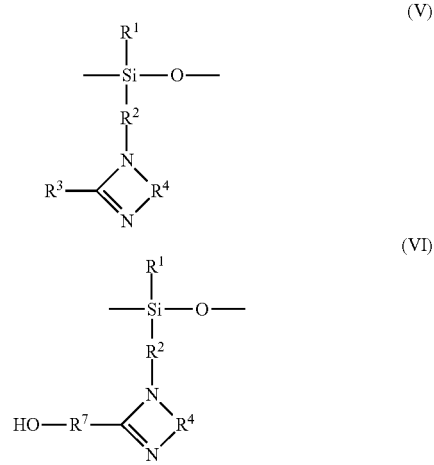

in which $R^1$ to $R^4$ and $R^7$ are as defined above and can also be present in the form of salts of an acid, depending on the pH set.

In the polysiloxane, the structural element of formula (V) preferably makes up 0-10 mol. %, more preferably 0-5 mol. % based on the polysiloxane. The structural element of formula (VI) is added to the polysiloxane preferably at 0-4 mol. %, more preferably 0-2 mol. %. In another embodiment, the lower limit of the structural elements of formula (V) and/or (VI) is 0.001 mol. %. The structural elements of formula (V) and/or (VI) can be distributed in the polysiloxane statistically, alternately or in the form of blocks. The structural elements of formula (V) and (VI) are preferably statistically distributed in the polysiloxane molecule.

In a preferred embodiment, the polysiloxane comprises at least one structural element of formula (I) and/or (Ia), at least one structural element of formula (II), and optionally one structural element of formula (III) and/or (IIIa).

In another embodiment, the polysiloxane comprises at least one structural element of formula (I) and/or (Ia), at least one structural element of formula (II), and one structural element of formula (III) and/or (IIIa).

The polysiloxane according to the invention is preferably terminated in each case by $R'_3SiO$— and —$SiR'_3$, R' being, independently of one another, $C_{1-16}$ alkyl, $C_{1-16}$ alkoxy or —OH, preferably methyl, ethyl, n-propyl, i-propyl or —OH, and more preferably methyl or —OH.

The $R'_3SiO$— terminus is covalently bonded to the silicon atom of one of the terminal structural elements, while the —$SiR'_3$ moiety is covalently bonded to the oxygen atom of the other terminal structural element.

In particularly preferred embodiments, the polysiloxane is terminated by $Me_3SiO$— and —$SiMe_3$; $Me_3SiO$— and —$SiMe_2OH$; or $HOMe_2SiO$— and —$SiMe_2OH$.

In a particularly preferred embodiment, the polysiloxane of the present invention is free of epoxide groups.

The notation "$C_{x-y}$ alkyl" means, in each case, a linear or branched alkyl moiety having x-y carbon atoms, for example $C_{1-6}$ alkyl can be methyl, ethyl, n-propyl, i-propyl, n-butyl, i-butyl, n-pentyl, i-pentyl, n-hexyl or i-hexyl. The notation "$C_{3-6}$ alkenyl" means a linear or branched alkenyl moiety having 3-6 carbon atoms, for example ethenyl, n-propenyl, i-propenyl, n-butenyl, i-butenyl, n-pentenyl, i-pentenyl, n-hexenyl or i-hexenyl. The notation "$C_{x-y}$ alkoxy" means an —O—$C_{x-y}$ alkyl grouping.

The overall nitrogen content of the polysiloxane is preferably 0.05-6 wt. %, preferably 0.1-3 wt. %, based on the overall composition.

Preferably at least 40%, more preferably at least 50%, and even more preferably at least 60% of all the heterocycles in the polysiloxane molecule are quaternized.

In a preferred embodiment, the weight average molecular weight $M_w$ of the polysiloxane is 2,000-100,000 g/mol, preferably 3,000-80,000 g/mol, more preferably 5,000-60,000 g/mol.

A further aspect of the invention is a preparation comprising a polysiloxane according to the invention, and water and/or an organic solvent. The preparations preferably contain water and an organic solvent in addition to the polysiloxane according to the invention. Preferably, halogenated and non-halogenated hydrocarbons, alcohols, glycols, ethers, esters, ketones, aromatics, e.g. benzol, phenol or xylol, and polyoxyalkylenes, in particular polyethylene glycol and polypropylene glycol, are used as the organic solvent. The preparations are preferably present in the form of solutions or in the form of emulsions, in particular macroemulsions or microemulsions.

The preparations can further comprise additives known to a person skilled in the art, such as emulsifiers, hydrotropics, organic acids such as acetic acid, inorganic and/or organic particles, fatty acid condensates, polyalkylene waxes, fluorinated polymers and/or silicones. The proportion of the additives is preferably from 0, 1, 2 or 5 wt. % to 20, 25 or 30 wt. % based on the overall preparation.

The preparations according to the invention preferably contain at least one emulsifier and/or at least one hydrotropic, in particular at least one emulsifier.

Anionic, cationic, non-ionic or amphoteric emulsifiers or mixtures thereof can be used as emulsifiers. Preferably, alkoxylation products of aliphatic alcohols having 6 to 22 carbon atoms are used, which comprise up to 50 Mol alkylene oxide units, in particular ethylene oxide and/or propylene oxide units. The alcohols can preferably contain 8 to 16 carbon atoms, can be saturated, linear or preferably branched, and can be used either individually or in mixtures.

The above-mentioned emulsifiers produced from branched aliphatic alcohols are particularly preferred on account of their favourable overall properties. Examples of these are ethoxylates of 2,6,8-trimethyl-4-nonanol, isodecyl alcohol or isotridecyl alcohol, each having 2-50 Mol, in particular 3-15 Mol ethylene oxide units.

The emulsifiers mentioned above are particularly advantageous in terms of low foam formation in the application liquors if alkylene oxide units are present distributed statistically and preferably distributed in the form of blocks.

A polyfunctional alcohol can be used as the hydrotropic. Thus, dialcohols having 2-10, preferably 2-6, in particular 2-4 carbon atoms per molecule can be used. Monoethers and diethers thereof, as well as monoesters and disesters thereof are also suitable. Particularly preferred hydrotropics are butyl diglycol, 1,2-propylene glycol and dipropylene glycol.

In a preferred embodiment, the preparations according to the invention can further comprise conventional polysiloxanes and/or fatty acid condensates. Mixtures of this kind are extremely homogeneous and stable, and have a handle which is significantly improved compared with the pure fatty acid condensates.

In a preferred embodiment, the preparation according to the invention contains approximately 3-80 wt. %, preferably 5-60 wt. %, and more preferably 10-50 wt. % of the polysiloxane according to the invention, based on the overall preparation.

It has been found that textile products finished with preparations according to the invention also have an antistatic effect as well as an improvement in sewability. Yarns finished therewith in addition exhibited significantly improved behaviour in terms of their processability.

The preparations according to the invention are obtained in mixing processes known to a person skilled in the art, at temperatures of preferably 10-80° C. Polysiloxanes according to the invention can thus be made into an emulsion for example by using moderate to high shearing forces, for example by means of agitators, ULTRA-TURRAX dispersing devices or homogenisers. In this case, the addition of an acid, for example acetic acid or lactic acid, significantly promotes the emulsification process in some circumstances.

A further aspect of the present invention is a method for producing a polysiloxane according to the invention. For this purpose, a polysiloxane is provided that comprises at least one structural element of formula (IV) (step (i)).

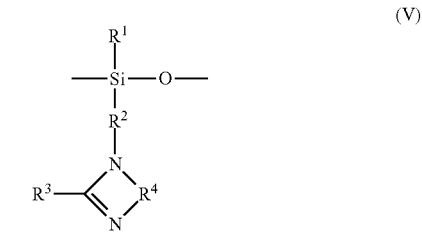

The structural element of formula (IV) of the polysiloxane provided in step (i) is subsequently reacted with $R_3$—COOH and optionally

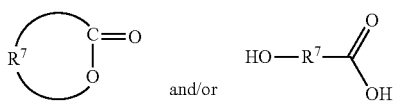

in step (ii) to form structural elements of formula (V) and optionally (VI).

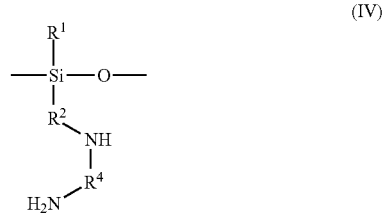

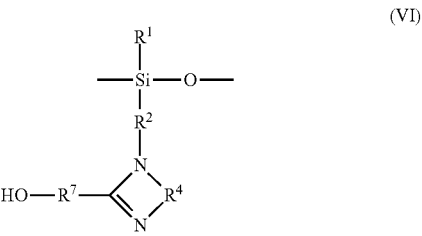

In step (iii), at least some of the nitrogen atoms in the structural elements of formula (V) and optionally (VI) are quaternized.

In a preferred embodiment, the polysiloxane provided in step (i) comprises structural elements of formula (IV) and structural elements of formula (II). In a further variant, the polysiloxane provided in step (i) can contain exclusively structural elements of formula (IV). In this case, structural elements of formula (II) can be introduced into the polysiloxane in a later step.

The reaction in step (ii) preferably takes place at 120-230° C. The water released in the process can be continuously removed during the reaction, optionally in the presence of a solvent or an entrainer, e.g. xylol.

Step (iii) is preferably carried out using quaternizing agents known to a person skilled in the art, such as dimethyl sulfate, diethyl sulfate, methyl tosylate, methyl chloride or benzyl chloride, preferably in the presence of a solvent, e.g. butyl diglycol, at temperatures of between 10 and 80° C.

In a preferred embodiment, the quaternization rate of all the heterocycles in step (iii) is at least 40%, preferably at least 50%, more preferably at least 60%, based on all of the heterocycles.

The invention further relates to the use of the polysiloxanes according to the invention or the preparations according to the invention for finishing textiles, for example in aqueous baths and application liquors, optionally together with further preparation agents. Chemicals for crease-resistant finishing or other products which are conventionally used in textile application liquors can be taken into consideration as additional preparation agents.

It has been found that the polysiloxanes according to the invention exhibit excellent adhesion to both polar and non-polar fibres, and thus ensure good washing durability even when covalent bonding to the fibres does not occur.

Thus, woven fabrics, knitted fabrics and yarns made of natural fibres such as cotton or wool, and also synthetic fibres such as viscose, polyester, polyamide, polyacrylonitrile or polyolefin, can be effectively treated with the polysiloxanes or preparations according to the invention.

The concentration in the application liquors of the preparations according to the invention is selected such that the substrates treated contain between 0.1 and 5 wt. % of the polysiloxanes according to the invention, based on the weight of the substrate. A preferred use of the preparations or polysiloxanes according to the invention is carried out as a forced application, by soaking the substrate in the application liquor, subsequently squeezing it out in the Foulard machine, and subsequent drying. Further preferred usage possibilities are exhaust methods, spray applications, and application on one side by means of a printing or slop padding method.

It has been found that the polysiloxanes according to the invention and the preparations according to the invention are extremely suitable as textile finishing agents for various textile substrates. Thus, not only is it possible to maintain or improve the soft handle compared with conventionally finished textile substrates, but the known disadvantages of yellowing and pH instability of the application liquor set out in the prior art are overcome.

The invention further relates to the use of the polysiloxane according to the invention or the preparation according to the invention for hydrophobing objects. Hydrophobing objects can be carried out by coating the surface of the object. In this case, conventional methods are used, such as spraying, painting, printing, doctor knife coating, dipping, soaking, pressure-impregnating, etc. Alternatively, the polysiloxane according to the invention or the preparation according to the invention can be homogeneously worked into the material of the objects as an additive. In this case, the proportion of preparation or polysiloxane is intended to make up approximately 0.001-10 wt. %, preferably 0.1-5 wt. %, based on the matrix material.

The invention will be explained in greater detail on the basis of the following examples.

EXAMPLES

Comparative Example 1

Not According to the Invention

The preparation consists of an aqueous macroemulsion containing 10 wt. % REWOQUAT W 90 DPG from EVONIK, which contains 1-methyl-2-nortalgalkyl-3-tallow fatty acid amidoethyl imidazolinium methosulfate as the active component.

Comparative Example 2

Not According to the Invention

The preparation consists of an aqueous microemulsion containing 20 wt. % FINISH WR 301 from WACKER, an aminoethyl-aminopropyl functionalized organopolysiloxane, 10 wt. % of an isodecyl alcohol having 7 ethylene oxide groups, and 0.4 wt. % acetic acid 60%. The overall nitrogen content of the organopolysiloxane is 0.39 wt. %.

Comparative Example 3

Not According to the Invention

The preparation consists of an aqueous microemulsion containing 20 wt. % of the amido-functionalized organopolysiloxane DC 8813 from DOW CORNING, 10 wt. % of an isodecyl alcohol having 7 ethylene oxide groups, and 0.4 wt. % acetic acid 60%.

Comparative Example 4

Not According to the Invention

The preparation consists of an aqueous microemulsion of a polysiloxane having laterally positioned, quaternized nitrogen functions, the production of which is described in Example 1 of DE 19 652 524.

Comparative Example 5

Not According to the Invention

The preparation consists of an aqueous macroemulsion containing 20 wt. % of a polysiloxane, 8 wt. % of an isodecyl alcohol having 7 ethylene oxide groups, and 0.4 wt. % acetic acid 60%. In order to produce the emulsion, the above-mentioned components are mixed at temperatures of 10-80° C. and subsequently emulsified by means of portioned addition of water having a temperature of 10-80° C.

The polysiloxane used was produced in the following manner.

In a nitrogen atmosphere, a linear, aminoethyl-aminopropyl functionalized polysiloxane (162.2 g) having a titratable basic nitrogen content of 1.1% (corresponding to 3 mol. % of units of formula (IV)) was placed, together with palmitic acid (14.6 g) and xylol (48.0 g), in a three-necked flask comprising a KPG stirrer, an internal thermometer, a reflux condenser and a water separator. The mixture was heated, while stirring, to 160° C., stirred under reflux for 3 hours, and reaction water occurring in the process was removed at the water separator. As a reaction control, the acid value was determined, and was 2.1 mg/g KOH. Subsequently, caprolactone (1.19 g) was added and initially stirred under reflux for a further 2 hours. After the xylol had been removed by distillation, the temperature was raised to 180° C., and distillation was carried out for 1 hour at approximately 20 mbar. The basic nitrogen of the obtained polysiloxane was titrated and amounted to 0.50%. Butyl diglycol (44.0 g), distilled water (24.0 g) and acetic acid 60% (3.1 g) were added to this product mixture at room temperature and stirred for 5 minutes. A clear, yellow oil of a polysiloxane comprising non-quaternized heterocycles was obtained.

The polysiloxane produced in this manner has the composition specified in Table 1, in which $R^1$ and $R^6$ are methyl, $R^2$ is $-(CH_2)_3-$, $R^4$ is $-(CH_2)_2-$, R' is methyl, $R^3$ is $-C_{15}H_{31}$ and $R^7$ is $-C_5H_{11}-$.

Example 6

According to the Invention

The preparation consists of an aqueous macroemulsion containing 20 wt. % of a polysiloxane, 8 wt. % of an isodecyl alcohol having 7 ethylene oxide groups, and 0.4 wt. % acetic acid 60%. In order to produce the emulsion, the above-mentioned components are mixed at temperatures of 10-80° C. and subsequently emulsified by means of portioned addition of water having a temperature of 10-80° C.

The polysiloxane used was produced in the following manner.

In a nitrogen atmosphere, a linear, aminoethyl-aminopropyl functionalized polysiloxane (162.2 g) having a titratable basic nitrogen content of 1.1% (corresponding to 3 mol. % of units of formula (IV)) was placed, together with palmitic acid (14.6 g) and xylol (48.0 g), in a three-necked flask comprising a KPG stirrer, an internal thermometer, a reflux condenser and a water separator. The mixture was heated, while stirring, to 160° C., stirred under reflux for 3 hours, and reaction water occurring in the process was removed at the water separator. As a reaction control, the acid value was determined, and was 2.1 mg/g KOH. Subsequently, caprolactone (1.19 g) was added and initially stirred under reflux for a further 2 hours. After the xylol had been removed by distillation, the temperature was raised to 180° C., and distillation was carried out for 1 hour at approximately 20 mbar. The basic nitrogen of the obtained polysiloxane was titrated and amounted to 0.50%. Butyl diglycol (36.0 g), distilled water (24.0 g) and dimethyl sulfate (8.0 g) were then added to this product mixture at a temperature of 90° C. and stirred for 2 hours at 90° C. The basic nitrogen of the obtained polysiloxane was determined and amounted to 0.01%. Acetic acid 60% (3.1 g) was added to this mixture. A clear, yellow oil of a polysiloxane having a quaternization rate of 99% based on the heterocycles was obtained.

The polysiloxane produced in this manner has the composition specified in Table 1, in which $R^1$ and $R^6$ are methyl, $R^2$ is —$(CH_2)_3$—, $R^4$ is —$(CH_2)_2$—, R' is methyl, $R^3$ is —$C_{15}H_{31}$, $R^7$ is —$C_5H_{11}$—, and $R^5$ is methyl.

Example 7

According to the Invention

The preparation consists of an aqueous macroemulsion containing 20 wt. % of a polysiloxane, 8 wt. % of an isodecyl alcohol having 7 ethylene oxide groups, and 0.4 wt. % acetic acid 60%. The emulsion was produced in the same manner as in Example 6.

The polysiloxane used was produced in the following manner.

In a nitrogen atmosphere, a linear, aminoethyl-aminopropyl functionalized polysiloxane (183.2 g) having a titratable basic nitrogen content of 0.8% (corresponding to 2.2 mol. % of units of formula (IV)) was placed, together with behenic acid (16.6 g) and xylol (49.0 g), in a three-necked flask comprising a KPG stirrer, an internal thermometer, a reflux condenser and a water separator. The mixture was heated, while stirring, to 160° C., stirred under reflux for 3 hours, and reaction water occurring in the process was removed at the water separator. As a reaction control, the acid value was determined, and was 3.6 mg/g KOH. Subsequently, butyrolactone (0.60 g) was added and initially stirred under reflux for a further 2 hours. After the xylol had been removed by distillation, the temperature was raised to 180° C., and distillation was carried out for 1 hour at approximately 20 mbar. The basic nitrogen of the obtained polysiloxane was titrated and amounted to 0.37%. Butyl diglycol (37.0 g), distilled water (25.0 g) and dimethyl sulfate (4.1 g) were then added to this product mixture at a temperature of 90° C. and stirred for 2 hours at 90° C. The basic nitrogen of the obtained polysiloxane was determined and amounted to 0.11%. Acetic acid 60% (3.0 g) was added to this mixture. A clear, yellow oil of a polysiloxane having a quaternization rate of 62% based on all the heterocycles was obtained.

The polysiloxane produced in this manner has the composition specified in Table 1, in which $R^1$ and $R^6$ are methyl, $R^2$ is —$(CH_2)_3$—, $R^4$ is —$(CH_2)_2$—, R' is methyl, $R^3$ is —$C_{21}H_{43}$, $R^7$ is —$C_3H_7$- and $R^5$ is methyl.

Example 8

According to the Invention

The preparation consists of an aqueous macroemulsion containing 20 wt. % of a polysiloxane, 8 wt. % of an isodecyl alcohol having 7 ethylene oxide groups, and 0.4 wt. % acetic acid 60%. The emulsion was produced in the same manner as in Example 6.

The polysiloxane used was produced in the following manner.

In a nitrogen atmosphere, a linear, aminoethyl-aminopropyl functionalized polysiloxane (168.6 g) having a titratable basic nitrogen content of 1.0% (corresponding to 2.7 mol. % of units of formula (IV)) was placed, together with lauric acid (5.9 g), stearic acid (5.65 g) and xylol (51.0 g), in a three-necked flask comprising a KPG stirrer, an internal thermometer, a reflux condenser and a water separator. The mixture was heated, while stirring, to 160° C., stirred under reflux for 3 hours, and reaction water occurring in the process was removed at the water separator. As a reaction control, the acid value was determined, and was 2.9 mg/g KOH. Subsequently, valerolactone (1.3 g) was added and initially stirred under reflux for a further 2 hours. After the xylol had been removed by distillation, the temperature was raised to 180° C., and distillation was carried out for 1 hour at approximately 20 mbar. The basic nitrogen of the obtained polysiloxane was titrated and amounted to 0.48%. Butyl diglycol (36.0 g), distilled water (25.0 g) and dimethyl sulfate (7.5 g) were then added to this product mixture at a temperature of 90° C. and stirred for 2 hours at 90° C. The basic nitrogen of the obtained polysiloxane was determined and amounted to 0.01%. Acetic acid 60% (3.0 g) was added to this mixture. A clear, yellow oil of a polysiloxane having a quaternization rate of 98% based on all the heterocycles was obtained.

The polysiloxane produced in this manner has the composition specified in Table 1, in which $R^1$ and $R^6$ are methyl, $R^2$ is —$(CH_2)_3$—, $R^4$ is —$(CH_2)_2$—, R' is methyl, $R^3$ is a mixture of —$C_{11}H_{23}$ and —$C_{17}H_{35}$, $R^7$ is —$C_4H_9$—, and $R^5$ is methyl.

Example 9

According to the Invention

The preparation consists of an aqueous macroemulsion containing 20 wt. % of a polysiloxane, 8 wt. % of an isodecyl alcohol having 7 ethylene oxide groups, and 0.4 wt. % acetic acid 60%. The emulsion was produced in the same manner as in Example 6.

The polysiloxane used was produced in the following manner.

In a nitrogen atmosphere, a linear, aminoethyl-aminopropyl functionalized polysiloxane (196.0 g) having a titratable basic nitrogen content of 0.62% (corresponding to 1.7 mol. % of units of formula (IV)) was placed, together with lauric acid (9.35 g) and xylol (41.0 g), in a three-necked flask comprising a KPG stirrer, an internal thermometer, a reflux condenser and a water separator. The mixture was heated, while stirring, to 160° C., stirred under reflux for 3 hours, and reaction water occurring in the process was removed at the water separator. As a reaction control, the acid value was determined, and was 4.2 mg/g KOH. After the xylol had been removed by distillation, the temperature was raised to 180° C., and distillation was carried out for 1 hour at approximately 20 mbar. The basic nitrogen of the obtained polysiloxane was titrated and amounted to 0.30%. Butyl diglycol (33.0 g), distilled water (25.0 g) and dimethyl sulfate (5.13 g) were then added to this product mixture at a temperature of 90° C. and stirred for 2 hours at 90° C. The basic nitrogen of the obtained polysiloxane was determined and amounted to 0.02%. Acetic acid 60% (2.5 g) was added to this mixture. A clear, yellow oil of a polysiloxane having a quaternization rate of 93% based on all the heterocycles was obtained.

The polysiloxane produced in this manner has the composition specified in Table 1, in which $R^1$ and $R^6$ are methyl, $R^2$ is —$(CH_2)_3$—, $R^4$ is —$(CH_2)_2$—, R' is methyl, $R^3$ is —$C_{11}H_{23}$, and $R^5$ is methyl.

Comparative Example 10

Not According to the Invention

The preparation consists of an aqueous milky transparent emulsion of a polysiloxane, the production of which is described in Example B of DE 10214982.

TABLE 1

Composition of the polysiloxanes used in the examples

| Example | (I) [mol. %] | (II) [mol. %] | (III) [mol. %] | (V) [mol. %] | (VI) [mol. %] | Quaternization [%] |
|---|---|---|---|---|---|---|
| 5 (comp. e.g.) | 0 | 96.97 | 0 | 2.72 | 0.31 | 0 |
| 6 | 2.69 | 96.97 | 0.31 | 0.03 | 0.00 | 98.9 |
| 7 | 1.25 | 97.83 | 0.09 | 0.77 | 0.06 | 61.9 |
| 8 | 2.20 | 97.26 | 0.50 | 0.03 | 0.01 | 98.5 |
| 9 | 1.56 | 98.31 | 0 | 0.12 | 0 | 92.7 |

The weight average molecular weight of the polysiloxane was approximately 20,000 g/mol in each case.

Usage Examples

Handle Assessment

Portions of a bleached cotton Terrycloth fabric that was not optically brightened were finished using an aqueous liquor from the preparations according to Examples 1-10 and 0.5 g/l acetic acid (60%) on a laboratory Foulard machine at a wet pickup of 80%, and subsequently dried for 2 minutes at 120° C. Subsequently, the handle character of the test fabric treated with the emulsions was assessed. This assessment is subject to different, subjective criteria. In order to nonetheless obtain meaningful results, assessment by at least 5 test persons is required. The results were evaluated according to statistical methods, a grade of 1 being the softest, most agreeable handle, and a grade of 5 being the hardest handle having the least smooth surface and being the least agreeable in the test series.

|  | Usage amount in g/l | Handle assessment within the test series |
|---|---|---|
| Comparative example 1 | 40 | 3.3 |
| Comparative example 2 | 20 | 1.4 |
| Comparative example 3 | 20 | 3.5 |
| Comparative example 4 | 20 | 2.1 |
| Comparative example 5 | 20 | 1.7 |
| Example 6 | 20 | 1.3 |
| Example 7 | 20 | 1.2 |
| Example 8 | 20 | 1.5 |
| Example 9 | 20 | 1.6 |
| Comparative example 10 | 13 | 2.6 |
| Untreated | 0 | 5 |

The preparations according to the invention provide the textiles finished therewith with an excellent soft handle compared with the commercially available soft handle agents.

Yellowing

Portions of a bleached cotton-modal knitted fabric that was not optically brightened were impregnated with an aqueous liquor from the preparations according to Examples 1-10 and 0.5 g/l acetic acid 60% on a laboratory Foulard machine at a wet pickup of 80%, dried for 2 minutes at 120° C., and subsequently thermoset for 2 minutes at 170° C. Subsequently, the whiteness of the samples was assessed according to Ganz using the whiteness measuring device "datacolor 600" from "datacolor international" (Switzerland).

|  | Usage amount in g/l | Whiteness according to Ganz |
|---|---|---|
| Comparative example 1 | 40 | 192 |
| Comparative example 2 | 20 | 185 |
| Comparative example 3 | 20 | 204 |
| Comparative example 4 | 20 | 210 |
| Comparative example 5 | 20 | 198 |
| Example 6 | 20 | 208 |
| Example 7 | 20 | 204 |
| Example 8 | 20 | 208 |
| Example 9 | 20 | 207 |
| Comparative example 10 | 13 | 203 |
| Untreated | 0 | 203 |

The preparations according to the invention do not result in any yellowing of the textile substrate. The whiteness of the substrates finished with the preparations according to the invention corresponds to that of the untreated textile.

Alkali Stability

The stability of the emulsions against alkalis in application liquors was carried out according to the test described in the following:

500 ml of an aqueous solution of the emulsion to be tested were placed in a 1000 ml beaker at a concentration of 40 g/l, and set to a pH of 12 by means of sodium hydroxide solution (w(NaOH)=10%). Subsequently, the liquor was stirred for 20 minutes using a blade agitator at 2000 rotations per minute. Subsequently, the agitator was turned off and after 1 hour the surface of the liquid was assessed for precipitation.

|  | Assessment after 1 hour |
|---|---|
| Comparative example 1 | heavy precipitation |
| Comparative example 2 | heavy precipitation |
| Comparative example 3 | light precipitation |
| Comparative example 4 | no precipitation |
| Comparative example 5 | heavy precipitation |
| Example 6 | no precipitation |
| Example 7 | no precipitation |
| Example 8 | no precipitation |
| Example 9 | no precipitation |
| Comparative example 10 | light precipitation |

Even at a pH of 12, the preparations according to the invention still do not exhibit any tendencies to precipitate. Preparations of this kind can be stably classified as a pH value.

The invention comprises the following embodiments:

1. Polysiloxane comprising at least one structural element of formula (I),

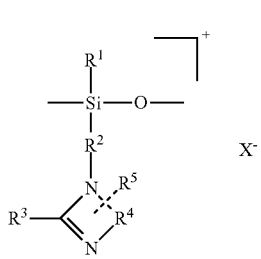

(I)

wherein $R^1$ is $C_{1-6}$ alkyl or phenyl, $R^2$ is $C_{1-6}$ alkyl, $R^3$ is a saturated or at least monounsaturated, linear or branched hydrocarbon moiety having 7-29, preferably 11-25, carbon atoms, optionally substituted with hydroxy, $R^4$ is —$C_aH_{2a}$—, optionally substituted with $C_{1-6}$ alkyl, $C_{1-6}$ alkoxy, hydroxy or amino, $R^5$ is a saturated, at least monounsaturated or aromatic hydrocarbon moiety having 1-20 carbon atoms, which optionally contains heteroatoms selected from S, O and N, is optionally substituted and, together with one of the two nitrogen atoms in the ring structure, forms a quaternary ammonium ion, a is 2 or 3, and $X^-$ is an organic or inorganic anion.

2. Polysiloxane according to point 1, comprising at least one structural element of formula (Ia)

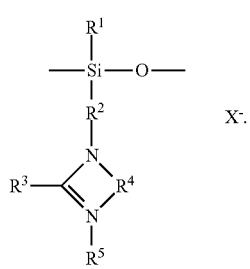

(Ia)

3. Polysiloxane according to either point 1 or point 2, wherein $R^1$ is $C_{1-6}$ alkyl, preferably methyl.

4. Polysiloxane according to any of the preceding points, wherein $R^2$ is —$(CH_2)_3$— or —$CH_2$—$CHCH_3$—$CH_2$—.

5. Polysiloxane according to any of the preceding points, wherein $R^3$ is a saturated or at least monounsaturated hydrocarbon moiety of a fatty acid.

6. Polysiloxane according to any of the preceding points, wherein $R^4$ is —$CH_2$—$CH_2$— or —$(CH_2)_3$—, preferably —$CH_2$—$CH_2$—.

7. Polysiloxane according to any of the preceding points, wherein $R^5$ is $C_{1-6}$ alkyl, preferably methyl, ethyl or benzyl.

8. Polysiloxane according to any of the preceding points, wherein the structural element of formula (I) makes up 0.1-20 mol. %, preferably 0.3-10 mol. %, more preferably 0.5-5 mol. % based on the polysiloxane.

9. Polysiloxane according to any of the preceding points, further comprising at least one structural element of formula (II),

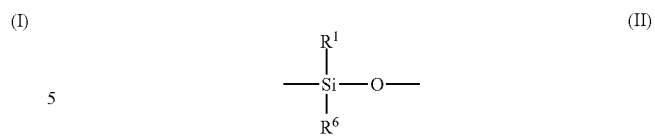

wherein $R^6$ is $C_{1-10}$ alkyl or phenyl.

10. Polysiloxane according to point 9, wherein $R^6$ is methyl, ethyl or phenyl.

11. Polysiloxane according to any of the preceding points, wherein the structural element of formula (II) makes up 80-99.9 mol. %, preferably 90-99.7 mol. %, more preferably 95-99.5 mol. % based on the polysiloxane.

12. Polysiloxane according to any of the preceding points, further comprising at least one structural element of formula (III),

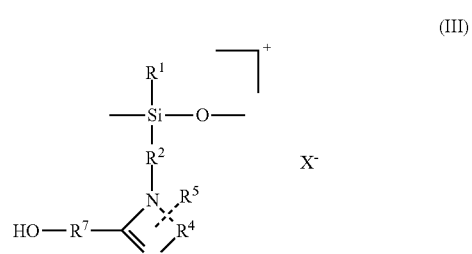

(III)

wherein $R^7$ is $C_{2-6}$ alkyl or $C_{3-6}$ alkenyl.

13. Polysiloxane according to point 12, comprising a structural element of formula (IIIa)

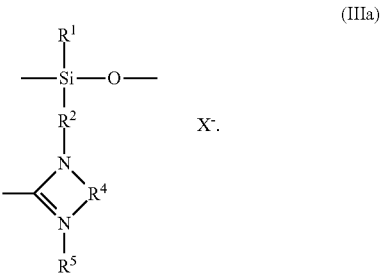

(IIIa)

14. Polysiloxane according to either point 12 or point 13, wherein $R^7$ is n-propyl, propyl, n-butyl, i-butyl, n-pentyl, i-pentyl or propenyl, preferably n-propyl.

15. Polysiloxane according to any of the preceding points, wherein the structural element of formula (III) makes up 0-4 mol. %, preferably 0-3 mol. %, more preferably 0-2 mol. % based on the polysiloxane.

16. Polysiloxane according to any of the preceding points, wherein the polysiloxane is terminated in each case by $R'_3SiO$— and —$SiR'_3$, R' being, independently of one another, $C_{1-16}$ alkyl, $C_{1-16}$ alkoxy or —OH, preferably methyl, ethyl, n-propyl, i-propyl or —OH.

17. Polysiloxane according to point 16, wherein R' is, independently of one another, methyl or —OH.

18. Polysiloxane according to either point 16 or point 17, wherein the polysiloxane is terminated in each case by Me$_3$SiO— and —SiMe$_3$; Me$_3$SiO— and —SiMe$_2$OH; or HOMe$_2$SiO— and —SiMe$_2$OH.

19. Polysiloxane according to any of the preceding points, wherein the overall nitrogen content of the polysiloxane is 0.05-6 wt. %, preferably 0.1-3 wt. %, based on the overall composition.

20. Polysiloxane according to any of the preceding points, wherein at least 40%, preferably at least 50%, more preferably at least 60% of the heterocycles in the polysiloxane are quaternized.

21. Polysiloxane according to any of the preceding points, wherein the weight average molecular weight of the polysiloxane is in the range of 2,000-100,000 g/mol, preferably 2,000-80,000 g/mol, more preferably 5,000-60,000 g/mol.

22. Preparation comprising a polysiloxane according to any of points 1 to 21 and water and/or an organic solvent.

23. Preparation according to point 22, wherein the organic solvent is selected from halogenated and non-halogenated hydrocarbons, alcohols, glycols, ethers, esters, ketones, aromatics and polyoxyalkylenes.

24. Preparation according to either point 22 or point 23, further comprising a surfactant, inorganic and/or organic particles, fatty acid condensates, polyalkylene waxes, fluorinated polymers and/or silicons.

25. Method for producing a polysiloxane according to any of points 1 to 21, comprising the steps of:
    (i) providing a polysiloxane comprising at least one structural element of formula (IV)

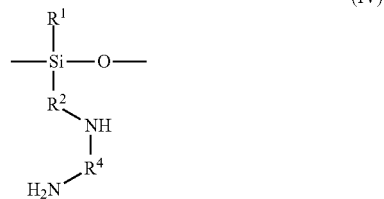
(IV)

(ii) reacting the structural element of formula (IV) in the polysiloxane from step (i) with R$_3$—COOH and optionally

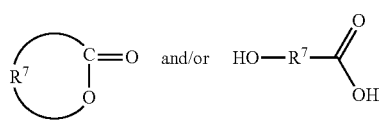

to form structural elements of formula (V) and optionally (VI)

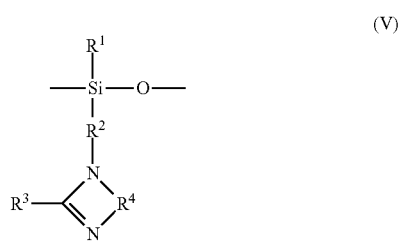
(V)

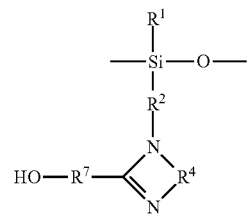
(VI)

and
    (iii) quaternizing at least some of the nitrogen atoms.

26. Method according to point 25, wherein the quaternization rate in step (iii) is at least 40%, preferably at least 50%, more preferably at least 60%, based on the heterocycles in the polysiloxane.

27. Use of the polysiloxane according to any of points 1 to 21 or of a preparation according to any of points 22 to 24 for finishing textiles.

28. Use of the polysiloxane according to any of points 1 to 21 or of a preparation according to any of points 22 to 24 for hydrophobing objects.

The invention claimed is:

1. Polysiloxane comprising at least one structural element of formula (I)

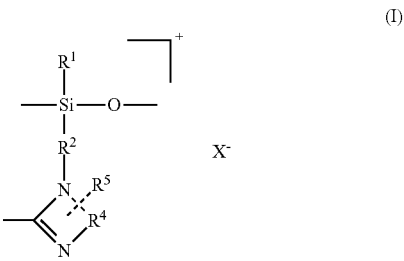
(I)

wherein
R$^1$ is a C$_{1-6}$ alkyl or a phenyl,
R$^2$ is a C$_{1-6}$ alkyl,
R$^3$ is a saturated or at least monounsaturated, linear or branched, hydrocarbon moiety having 7-29 carbon atoms, optionally substituted with hydroxy,
R$^4$ is —C$_a$H$_{2a}$—, optionally substituted with C$_{1-6}$ alkyl, C$_{1-6}$ alkoxy, hydroxyl, or amino,
R$^5$ is attached to one of the two nitrogen atoms in the ring structure forming a quaternary ammonium ion and is a saturated or at least monounsaturated, or aromatic, hydrocarbon moiety having 1-20 carbon atoms, which optionally contains heteroatoms selected from S, O, and N, and is optionally substituted,
a is 2 or 3, and
X$^-$ is an organic or inorganic anion.

2. Polysiloxane according to claim 1, wherein R$^1$ is C$_{1-6}$ alkyl.

3. Polysiloxane according to claim 1, wherein R$^2$ is —(CH$_2$)$_3$— or —CH$_2$—CHCH$_3$—CH$_2$—.

4. Polysiloxane according to claim 1, wherein R$^3$ is a saturated or at least monounsaturated hydrocarbon moiety of a fatty acid.

5. Polysiloxane according to claim 1, wherein R$^4$ is —CH$_2$—CH$_2$— or —(CH$_2$)$_3$—.

6. Polysiloxane according to claim 1, wherein R$^5$ is C$_{1-6}$ alkyl.

7. Polysiloxane according to claim 1, wherein the structural element of formula (I) is present in an amount of 0.1-20 mol. % based on the polysiloxane.

8. Polysiloxane according to claim 1, further comprising at least one structural element of formula (II),

wherein $R^6$ is a $C_{1-10}$ alkyl or a phenyl.

9. Polysiloxane according to claim 8, wherein the structural element of formula (II) is present in an amount of 80-99.9 mol. % based on the polysiloxane.

10. Polysiloxane according to claim 1, further comprising at least one structural element of formula (III),

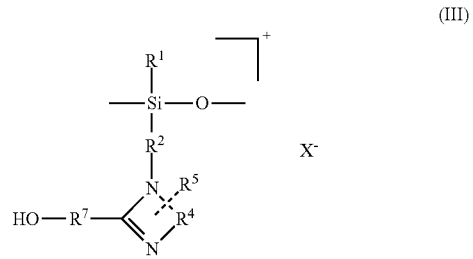

wherein $R^7$ is $C_{2-6}$ alkyl or $C_{3-6}$ alkenyl.

11. Polysiloxane according to claim 10, wherein the structural element of formula (III) is present in an amount of up to 4 mol. % based on the polysiloxane.

12. Polysiloxane according to claim 1, further comprising terminating the silicon atom in the polysiloxane with $R'_3SiO$— and terminating the oxygen atom in the polysiloxane with —$SiR'_3$, wherein the R' is independently of one another, $C_{1-16}$ alkyl, $C_{1-16}$ alkoxy, or —OH.

13. Polysiloxane according to claim 1, wherein the overall nitrogen content of the polysiloxane is 0.05-6 wt. % based on the overall composition.

14. Polysiloxane according to claim 1, wherein at least 40% of the heterocycles in the polysiloxane are quaternized.

15. Polysiloxane according to claim 1, wherein $R^3$ is a saturated or at least monounsaturated, linear or branched, hydrocarbon moiety having 11-25 carbon atoms, optionally substituted with hydroxyl.

16. Polysiloxane according to claim 2, wherein $R^1$ is methyl.

17. Polysiloxane according to claim 5, wherein $R^4$ is —$CH_2$—$CH_2$—.

18. Polysiloxane according to claim 6, wherein $R^5$ is methyl, ethyl, or benzyl.

19. Polysiloxane according to claim 7, wherein the structural element of formula (I) is present in an amount of 0.3-10 mol. % based on the polysiloxane.

20. Polysiloxane according to claim 19, wherein the structural element of formula (I) is present in an amount of 0.5-5 mol. % based on the polysiloxane.

21. Polysiloxane according to claim 9, wherein the structural element of formula (II) is present in an amount of 90-99.7 mol. % based on the polysiloxane.

22. Polysiloxane according to claim 21, wherein the structural element of formula (II) is present in an amount of 95-99.5 mol. % based on the polysiloxane.

23. Polysiloxane according to claim 11, wherein the structural element of formula (III) is present in an amount of up to 3 mol. % based on the polysiloxane.

24. Polysiloxane according to claim 23, wherein the structural element of formula (III) is present in an amount of up to 2 mol. % based on the polysiloxane.

25. Polysiloxane according to claim 12, further comprising terminating the silicon atom in the polysiloxane with $R'_3SiO$— and terminating the oxygen atom in the polysiloxane with —$SiR'_3$, wherein the R' is independently of one another methyl, ethyl, n-propyl, i-propyl or —OH.

26. Polysiloxane according to claim 13, wherein the overall nitrogen content of the polysiloxane is 0.1-3 wt. % based on the overall composition.

27. Polysiloxane according to claim 14, wherein at least 50% of the heterocycles in the polysiloxane are quaternized.

28. Polysiloxane according to claim 14, wherein at least 60% of the heterocycles in the polysiloxane are quaternized.

29. Preparation comprising the polysiloxane according to claim 1 and water and/or an organic solvent.

30. A method of using the preparation according to claim 29 for finishing textiles or for hydrophobing objects comprising coating the surface of the textiles or the objects with the preparation or adding the preparation to the textiles or the objects as an additive.

31. Method for producing the polysiloxane according to claim 1, comprising the steps of:
(i) providing a polysiloxane comprising at least one structural element of formula (IV)

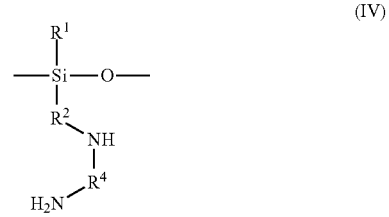

(ii) reacting the structural element of formula (IV) in the polysiloxane from step (i) with $R_3$—COOH and optionally

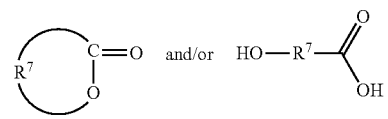

to form structural elements of formula (V) and optionally (VI),

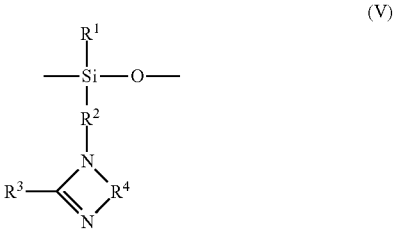

-continued

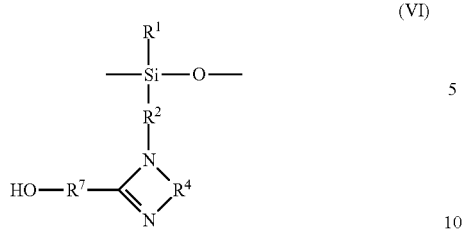

(VI)

and
(iii) quaternizing at least some of the nitrogen atoms.

32. Method according to claim 31, wherein the quaternization rate in step (iii) is at least 40% based on the heterocycles in the polysiloxane.

33. Method according to claim 32, wherein the quaternization rate in step (iii) is at least 50% based on the heterocycles in the polysiloxane.

34. Method according to claim 33, wherein the quaternization rate in step (iii) is at least 60% based on the heterocycles in the polysiloxane.

35. A method of using the polysiloxane according to claim 1 for finishing textiles or for hydrophobing objects comprising coating the surface of the textiles or the objects with the polysiloxane or adding the polysiloxane to the textiles or the objects as an additive.

\* \* \* \* \*